(12) United States Patent
Hu et al.

(10) Patent No.: US 11,131,578 B2
(45) Date of Patent: Sep. 28, 2021

(54) TWO STAGE DETECTION METHOD FOR DISTRIBUTED VIBRATION DETECTION

(71) Applicant: NEC Laboratories America, Inc., Princeton, NJ (US)

(72) Inventors: Junqiang Hu, Davis, CA (US); Ting Wang, West Windsor, NJ (US)

(73) Assignee: NEC Corporation

( * ) Notice: Subject to any disclaimer, the term of this patent is extended or adjusted under 35 U.S.C. 154(b) by 152 days.

(21) Appl. No.: 16/455,586

(22) Filed: Jun. 27, 2019

(65) Prior Publication Data

US 2020/0003612 A1    Jan. 2, 2020

Related U.S. Application Data

(60) Provisional application No. 62/691,148, filed on Jun. 28, 2018.

(51) Int. Cl.
*G01H 9/00*    (2006.01)

(52) U.S. Cl.
CPC .................................. *G01H 9/004* (2013.01)

(58) Field of Classification Search
CPC ..................................................... G01H 9/004
See application file for complete search history.

(56) References Cited

PUBLICATIONS

Yang et al., An Asynchronous, Variable Length Two-Stage Packet Switch Fabric Architecture with Look-Ahead and Load-Balance Scheduling Schemes for Optical-Label Switching Networks, 2004 IEEE, IEEE Communications Society, pp. 1828-1834 (Year: 2004).*
IEEE Xplore Search Results, Jan. 17, 2021, 1 pp. (Year: 2021).*
Google Search Results, May 25, 2021, 1 pp. (Year: 2021).*

* cited by examiner

*Primary Examiner* — Toan M Le
(74) *Attorney, Agent, or Firm* — Joseph Kolodka

(57) ABSTRACT

Aspects of the present disclosure describe systems, methods and structures employing two-stage detection/analysis for distributed vibration sensing (DVS) along an optical fiber in which a first stage provides pre-processed signal data and the second stage—based on the first stage result—only processes locations that have or might have vibrational activity resulting in increased sensitivity and reduced false alarms.

10 Claims, 5 Drawing Sheets

TWO STAGE DETECTION METHOD FOR DISTRIBUTED VIBRATION DETECTION

CROSS REFERENCE TO RELATED APPLICATIONS

This application claims the benefit of U.S. Provisional Patent Application Ser. No. 62/691,148 filed 28 Jun. 2018 the entire contents of which is incorporated by reference as if set forth at length herein.

TECHNICAL FIELD

This disclosure relates generally to optical fiber sensing systems, methods, and structures. More particularly, it describes a two-stage detection method for distributed vibration detection.

BACKGROUND

As is known in the optical fiber sensing arts, distributed vibration sensing (DVS) is a technology used to detect vibration(s) anywhere along an optical fiber that—in turn—is in optical communication with an interrogator. The interrogator is a system that generates an input signal to the fiber, detects and analyzes reflected signals and subsequently outputs an indication of a detected vibration along the fiber. The interrogator can be conveniently installed and accessed, with the connecting fiber laid along locations wherever vibration detection is needed or desired. Because of its flexibility, robustness, and reasonably good performance, it has attracted popular interest in perimeter intrusion detection.

SUMMARY

An advance in the art is made according to aspects of the present disclosure directed to two-stage distributed vibration detection. In sharp contrast to the prior art, systems, methods, and structures according to the present disclosure employ the two-stage approach to maximize detection while reducing false alarm rate. Operationally, the first stage may exhibit a lowered threshold as compared to prior art approaches and identify a signal that was/would be ignored in prior art approaches—but may nevertheless be an alarm. Subsequently, a second stage employed in systems, methods, and structures according to aspects of the present disclosure utilize a location-configurable capture buffer, which captures all the details for specified location(s).

Operationally, once there is a triggered alarm identified by the first stage, the second stage operation identifies (captures) the triggering locations and obtains more detailed data from that location for more advanced processing. Such detailed data may be an original sample from an analog-to-digital converter (ADC) or—after low-pass filtering to eliminate wide band noise either due to optics or ADC, or with any other pre-processing. Advantageously the detailed data may provide a full spectrum of its scanning frequency (i.e., its pulse repetition rate), and the pattern during the activity which may advantageously be employed to determine any possible cause(s).

BRIEF DESCRIPTION OF THE DRAWING

A more complete understanding of the present disclosure may be realized by reference to the accompanying drawing in which.

Figure 1:
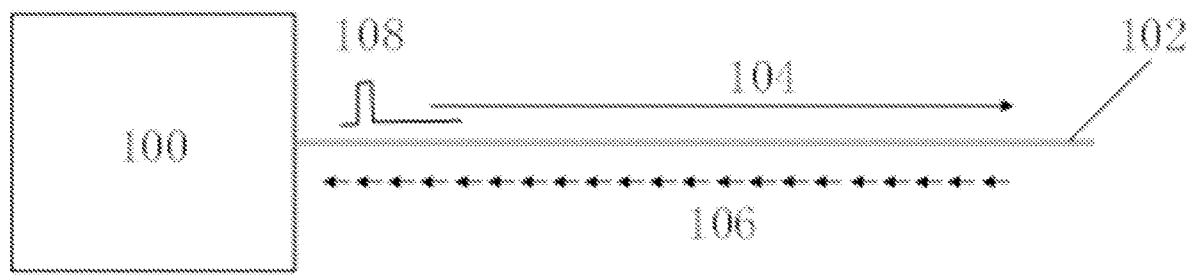
FIG. 1 is a schematic diagram illustrating a prior art digital vibration sensing (DVS) system.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background—and with initial reference to FIG. 1 which shows a schematic diagram of a prior art DVS system—we begin by noting that such an arrangement as shown in that figure may be part of a typical, perimeter intrusion detection system. As shown therein, interrogator 100 periodically generates optical pulses 108 and injects them into optical fiber 102. The optical pulse (signal) propagates along fiber 102 as generally illustrated by 104.

As is known by those skilled in the art, at each location along the fiber, a small portion of the optical pulse (signal) is reflected 106 back towards the interrogator. Typically, such reflections are due to Rayleigh scattering. The reflected signal(s) is/are converted to an electrical domain signal(s) and processed by the interrogator. Based on the time of injection of the optical pulses (signals) and reflected/scattered signal detection time, the interrogator is able to determine at which location a sample (particular reflected/scattered signal) is originating, thus able to sense/detect/determine activity at each location along the fiber.

Known further by those skilled in the art, a typical DVS system is capable of supporting an optical fiber length up to approximately 50 km in 1-2 m resolution. Analyzing all the signals in detail will result in very large calculation complexity, which increases system cost and possibly system size. As such, existing solutions employ simple pre-processing/aggregation to reduce the amount of data.

Figure 2:
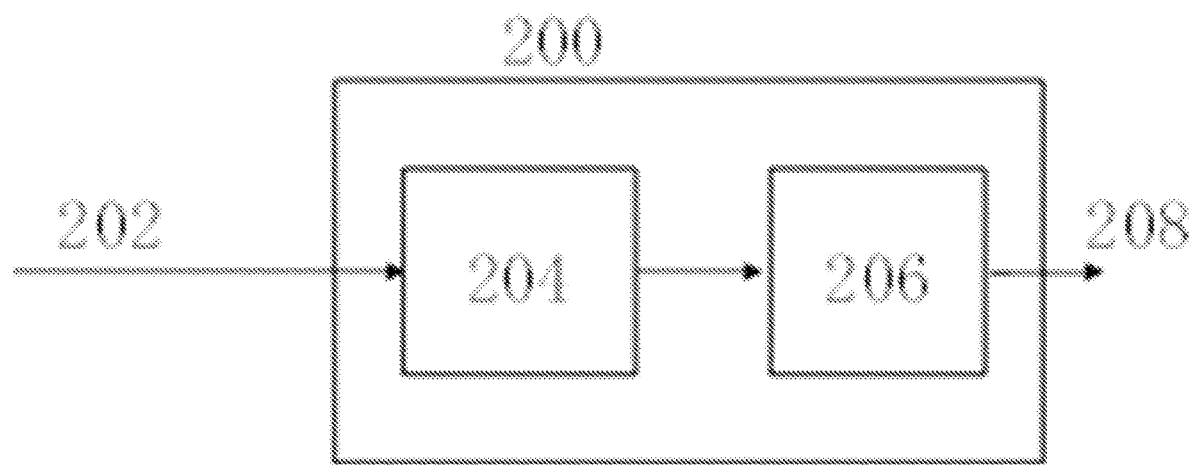
FIG. 2 is a schematic diagram illustrating a prior art interrogator processing arrangement.

Turning now to FIG. 2, there is shown a schematic diagram illustrating a prior art interrogator processing arrangement. With reference to that figure, it may be observed that such pre-processing/aggregation to reduce the amount of data may be performed 204, followed by an advanced algorithmic processing 206. One example of pre-processing is the calculation of aggregated power during a certain period, and then checking for a power variation or a power pattern.

As those skilled in the art will appreciate, one problem with such pre-processing or aggregation arrangements/methods is that detailed information may ge lost, and any abstracted result from the pre-processing may make it impossible to isolate a desired pattern from background noise.

By way of example only, in an intrusion detection application, the DVS is expected to differentiate human activity from weather—for example, wind, rain, and hail—caused vibrations and report only when human activity is a cause of such vibration(s). However, with pre-processing such as power accumulation, any difference(s) may be eliminated such that subsequent stage(s) may not be able to identify, which will generate a false alarm. As will be appreciated, false alarm rate is a critical system parameter and could be a major or sole reason that a detection system is acceptable in a commercial or other application. So, how to reduce false alarm rate(s) without losing detection sensitivity is a key challenge to such systems and,—advantageously—addressed by systems, methods, and structures according to the present disclosure.

As we shall now show and describe, systems, methods, and structures according to the present disclosure employ a two-stage approach to maximize detection while reducing false alarm rate. The first stage may exhibit a lowered threshold as compared to prior art approaches and identify a signal that was/would be ignored in prior art approaches—but may nevertheless be an alarm.

Advantageously, a second stage employed in systems, methods, and structures according to aspects of the present disclosure employ a location-configurable capture buffer, which captures all of the details for specified location(s). Operationally, once there is a triggered alarm from a first stage, the second stage operation identifies (captures) the triggering locations and obtains more detailed data from that location for more advanced processing. Such detailed data may be an original sample from an analog-to-digital converter (ADC) or—after low-pass filtering to eliminate wide band noise either due to optics or ADC, or with any other pre-processing. In general, the detailed data may provide a full-spectrum of its scanning frequency (i.e., its pulse repetition rate), and the pattern during the activity which may advantageously be employed to determine any possible cause(s).

Figure 3:
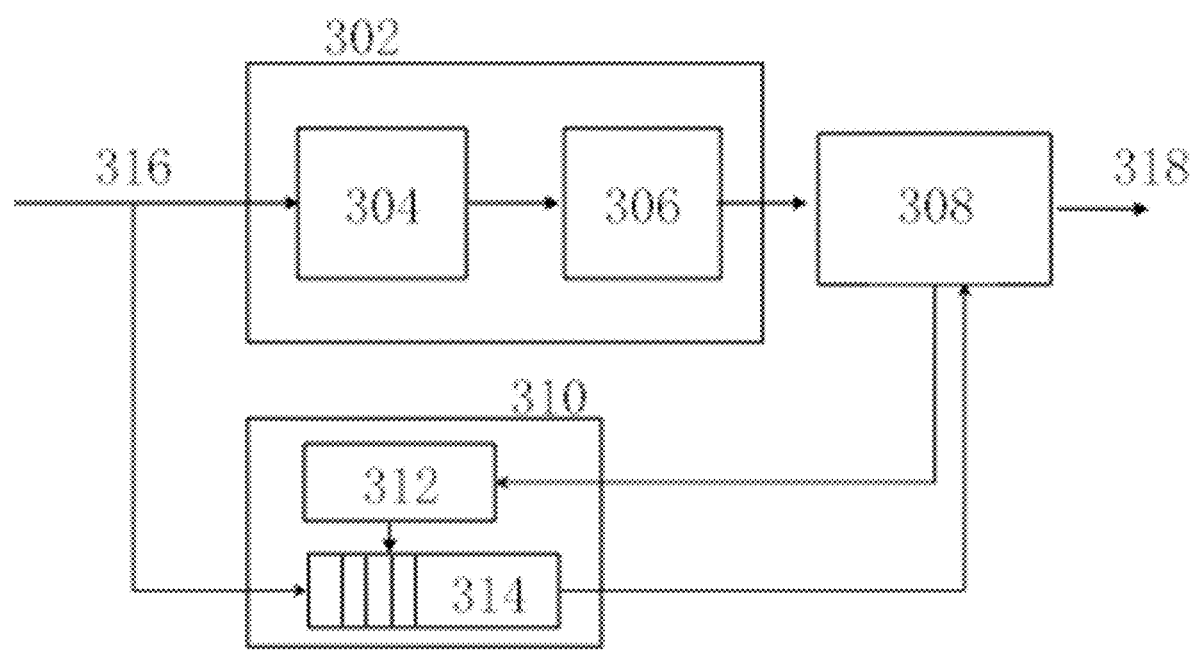
FIG. 3 is a schematic diagram illustrating two-stage processing with per-location capturing according to aspects of the present disclosure.

FIG. 3 is a schematic diagram illustrating two-stage processing with per-location capturing according to aspects of the present disclosure. With reference to that figure it may be observed that first stage processing 302 receives input signal 316, performs pre-processing 304 and preliminary decision 306 functions. We note that functions 304 and 306 are somewhat similar to functions 204 and 206 shown previously with respect to FIG. 2.

In one illustrative embodiment, pre-processing function 304 applies high pass filtering for DC removal, and low pass filtering to eliminate frequency that is not of interest, followed by power accumulation to derive power-per-interval value(s) for reduced signal amount. Preliminary decision function 306 may apply a same or similar algorithm as applied with respect to 206 of FIG. 2, or a simple threshold-based decision. Function block 310 provides per-location capturing logic according to aspects of the present disclosure—including capturing control logic 312 and capturing buffer 314. Capturing control logic 312 may include a register for a location of interest, which is configured by second stage handling module 306. Once there is activity detected by second stage handling module 306, second stage 308 will write the location ID (e.g., sample sequence) into the register in 312. Capturing control 312 enables buffer writing when the sample of the corresponding location arrives. The captured samples are read at block 308 to acquire more details, and make further decision(s) whether there is/are any activity of interest.

We note that main processing performed in 304 is per-location based—that is, signals from each location are grouped together to form time-interleaved samples of that location. Algorithms are applied within each such location.

Figure 4:
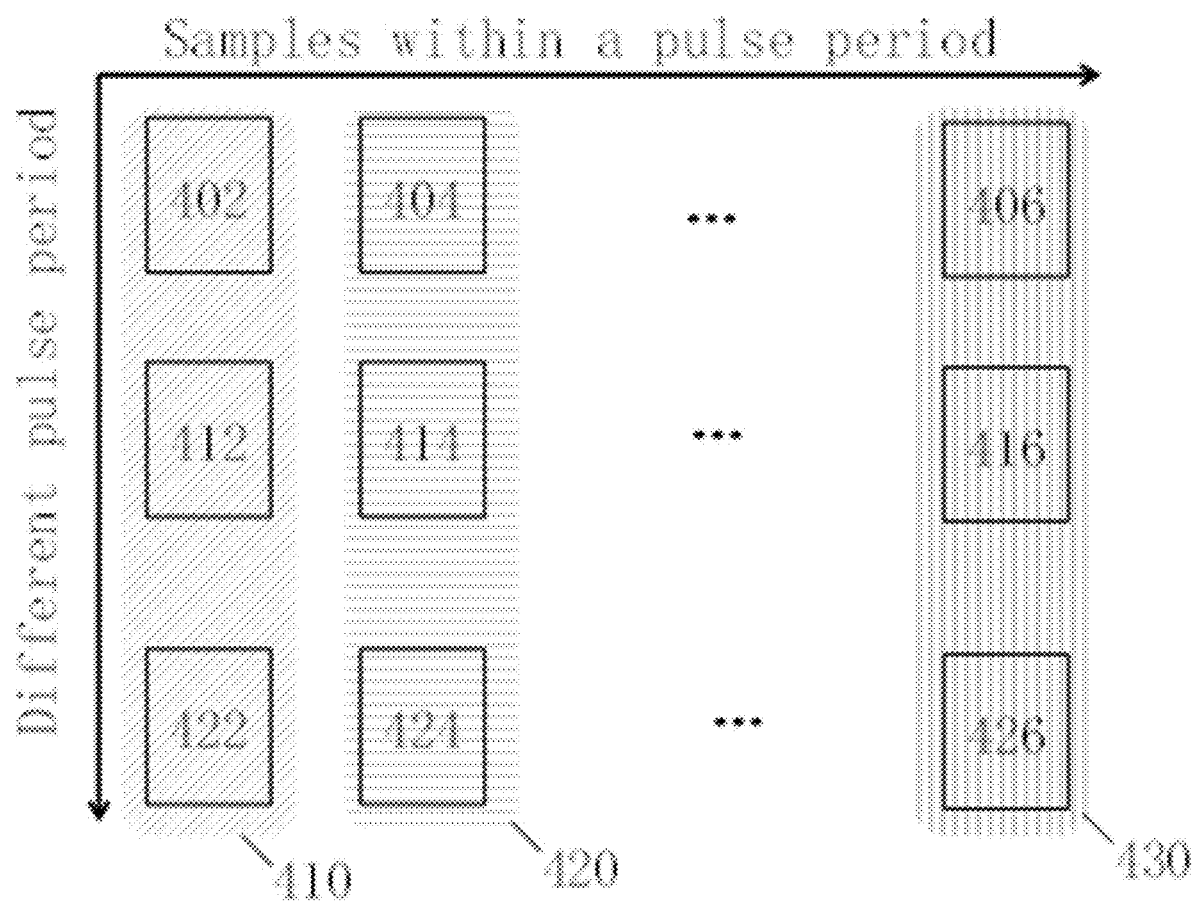
FIG. 4 is a schematic diagram illustrating per-location processing according to aspects of the present disclosure.

This concept is illustrated in FIG. 4, which is a schematic diagram illustrating per-location processing according to aspects of the present disclosure—where the horizontal samples, such as sample 402, 404, and 406, are location-by-location within each probing pulse period, while the vertical samples, such as 402, 412, and 422, are within each location. The processing is per-location based, such as applied to samples in 410.

We note that in one illustrative embodiment, systems according to aspects of the present disclosure have multiple per-location capturing modules, to simultaneously capture different locations. With respect to FIG. 3, block 308 manages these capturing resources including the allocation and release. If there is a new location with activity detected by 306, block 308 will allocate one capturing block. The capturing block is released if no activity detected from 306 within certain period, or keep on detecting the same pattern.

Because of limited resources, in stage 2 only some of the locations can be processed, so there is requirement to effectively allocate the resource. In one embodiment, block 308 manages the activity states of each location. In one example, there are three categories of activity state: no activity, investigating activity, and repeating activity. For locations in the "no activity" category, once there is activity reported from 306, block 308 allocates capturing buffer immediately and moves the location into the "investigating activity" category for a more detailed analysis. For locations in the "repeating activity" category, each location has an associated timer, that—when timer expires—the location will be moved to either "investigating" or "no activity" category, depending on whether there was activity reported from 306 while it was in the "repeating activity" category.

When entering the "investigating" state, the location will be assigned a capturing buffer. When exiting from the "investigating" state, the capturing buffer is released and can be used by other locations. For locations in the "repeating activity" category, the processing state and/or decision are maintained, for the processing in its next "investigating" state.

Figure 5:
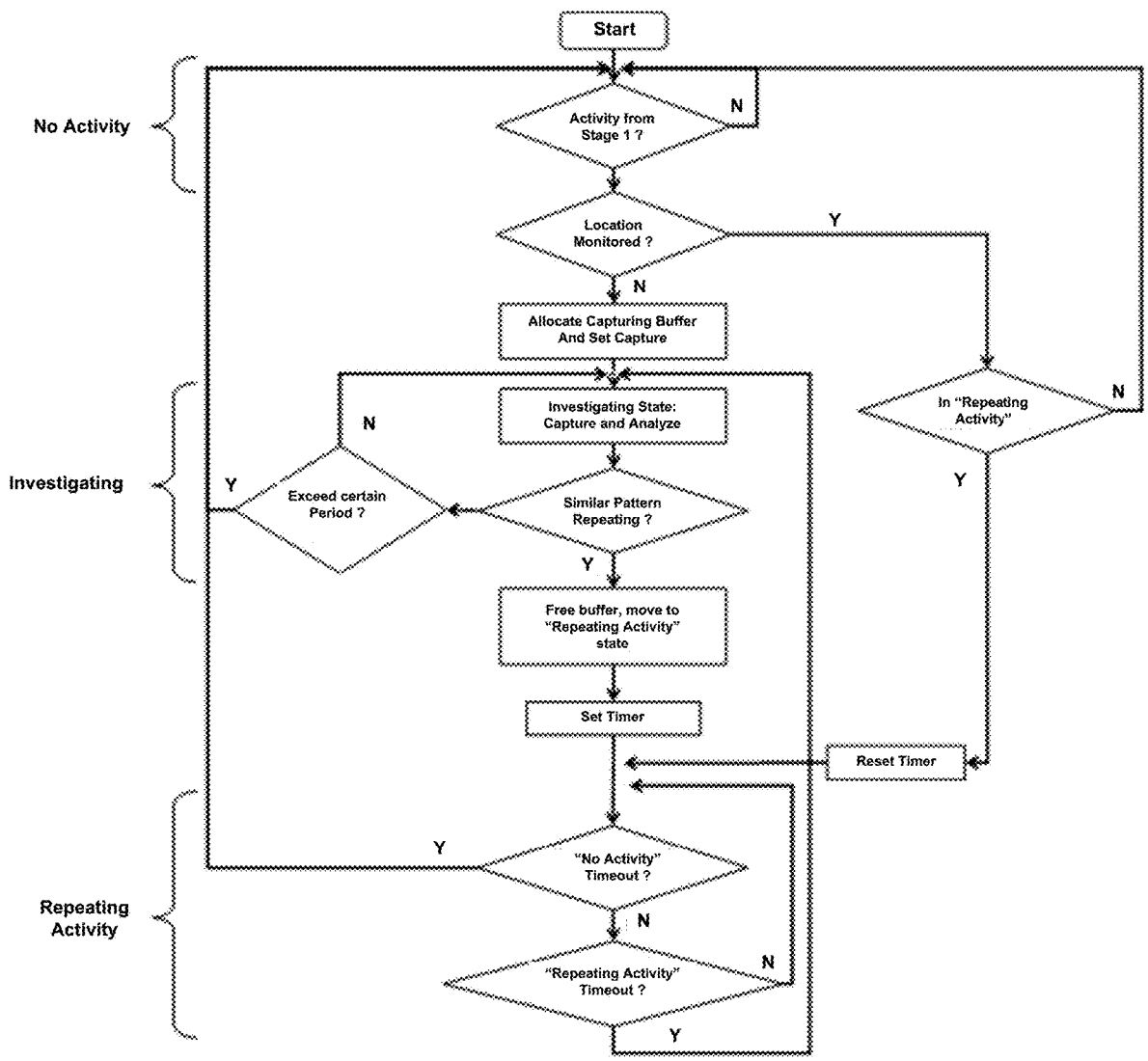
FIG. 5 is a flow diagram illustrating state management according to aspects of the present disclosure.

In one embodiment, each location in the "repeating activity" category has another timer—used to monitor whether activity has stopped. If no activity detected when that timer expires, the location will be moved to the "no activity" category. The first timer is set to multiple activity repeating periods, while the second timer is shorter than first timer. FIG. 5 is a flow diagram illustrating state management according to aspects of the present disclosure.

In one illustrative embodiment, whether move a location to a "repeating activity" category or not depends on the number of available capturing blocks. If the usage is low, and the location keeps on detecting activity, it may stay in the "investigating" category no matter it's repeating pattern or not. In another illustrative embodiment, the timeout value for locations in the "investigating" category is set based on capturing block usage rate, and its likelihood of activity-of-interest from 306 and 308.

For example, when capturing block usage is low, the timer can have larger expiration value; if the location has high possibility of detected activity from both 306 and 308, it may be configured with lower timeout value.

To save processing power and/or capturing buffers, stage 2 may also work in a "scanning" mode, in that it sequentially investigates each channel that has reported activity from stage 1. For the location(s) to investigate, it configures the location into capturing control logic, and reads/analyzes samples from that location. When the investigation is done, it moves to the next location that has reported activity and repeats the operation.

In yet another illustrative embodiment, second stage processing provides feedback to first stage decision module 306. Module 306 uses the feedback as "training" to increase its detection accuracy, and to reduce the processing workload in 308. In still another illustrative embodiment, module 306 makes decisions in 3 categories: "very unlikely", "maybe", and "very likely". Second stage processing 308 only handles the "maybe" category. Initially the threshold for the "maybe" category is wider, to ask second stage for further study. With trained knowledge and higher confidence, the first stage adjusts its threshold.

The information that the second stage uses for detailed analysis includes but not limited to, signal power level, power spectrum distribution, and time-frequency pattern. The second stage may pick the frequency of interest while ignoring others—or examine signal power pattern(s) to analyze the activity.

At this point, while we have presented this disclosure using some specific examples, those skilled in the art will recognize that our teachings are not so limited. Accordingly, this disclosure should be only limited by the scope of the claims attached hereto.

The invention claimed is:

1. A distributed optical fiber sensing system, said system operative to generate an optical pulse, input the optical pulse into the optical fiber, and determine vibrational activity for locations along the fiber from reflected signals, said system comprises:
   length of the optical fiber;
   an interrogator that generates an input optical signal and inputs that signal into the optical fiber; and
   a detector and analyzer that detects and analyzes signals reflected along the length of the optical fiber to determine a location along the optical fiber at which a vibration is affecting the fiber;
   wherein said detector and analyzer is a two-stage detection and analysis system having a first stage and a second stage, the first stage employs pre-processing to generate a result signal for each location along the optical fiber at which a vibration is affecting the fiber and then output the signals; the second stage receiving the output signals, the second stage includes a per-location capture buffer, the second stage obtaining continuous data from any location identified by the first stage as exhibiting activity, the second stage using that continuous data to determine whether there exists actual vibrational activity of interest.

2. The distributed optical fiber sensing system of claim 1 further comprises:
   the first stage pre-processing includes a band-pass filter followed by a power accumulator to generate power in a pre-determined interval, the power in that interval used to generate an output signal.

3. The distributed optical fiber sensing system of claim 1 further comprises:
   the second stage provides feedback to the first stage such that the first stage may adjust its output detection signals.

4. The distributed optical fiber sensing system of claim 1 further comprises:
   the first stage classifies its output result(s) to three classifications based on probable levels of activity, and only uncertain classifications are subsequently provided to the second stage.

5. The distributed optical fiber sensing system of claim 1 further comprises:
   the second stage performs per-location capturing.

6. The distributed optical fiber sensing system of claim 1 further comprises:
   the second stage includes multiple per-location buffers each one captures a single location.

7. The distributed optical fiber sensing system of claim 1 further comprises:
   multiple locations having possible activities detected by the first stage are processed simultaneously by the second stage by allocating one buffer for each individual one of the multiple locations.

8. The distributed optical fiber sensing system of claim 1 further comprises:
   the second stage identifies each location by a classification selected from the group consisting of "no activity", "investigating" and "repeating activity", wherein only locations identified by "investigating" have capture buffers allocated thereto.

9. The distributed optical fiber sensing system of claim 8 further comprises:
   locations identified by "investigating" are evaluated to determine whether activity is continuous or a one-time activity; locations determined to exhibit continuous activity are identified as "repeating activity", otherwise identified as "no activity".

10. The distributed optical fiber sensing system of claim 8 further comprises:
   locations identified by "investigating" are associated with a programmable timer, said timer for determining a change of location identifier to "no activity" or "repeating activity".

* * * * *